Oct. 23, 1951 — F. SCHUMACHER ET AL — 2,572,285
LIMB CONNECTION FOR DISPLAY FIGURES
Filed Feb. 14, 1946

INVENTORS
Fred Schumacher
Frank Ruppe
BY
ATTORNEY

Patented Oct. 23, 1951

2,572,285

UNITED STATES PATENT OFFICE 2,572,285

LIMB CONNECTION FOR DISPLAY FIGURES

Fred Schumacher and Frank Ruppe, Brooklyn, N. Y.

Application February 14, 1946, Serial No. 647,492

7 Claims. (Cl. 287—101)

This invention relates to improvements in display figures or dummies, as they are mainly used for advertising purposes or the like and more particularly to a new and useful limb connecting and adjusting device for such figures.

It is the principal object of our invention to provide such a device which will permit a ready and convenient regulation and adjustment of the limbs, especially the arms in their respective desired relative positions to the body, at any desired angle thereto.

Another object of the invention is to provide such a device equipped with an adjusting turning point allowing a ready turning of the arms into any desired or required position relatively to the figure's body and to lock the same in this position.

A further object of our invention is to provide such a device including a closing housing to be embedded into the material of the figure or its limbs provided with suitable outer threaded flanges and holes for the admittance of plastic material or the like.

A still further object of our invention is to provide such a device which is comparatively simple and inexpensive, yet durable and efficient in use and operation.

These and other objects and advantages of our invention will become more fully known as the description thereof proceeds and will then be more specifically defined in the accompanying claims.

In the accompanying drawing forming a material part of this disclosure:

Figure 1:
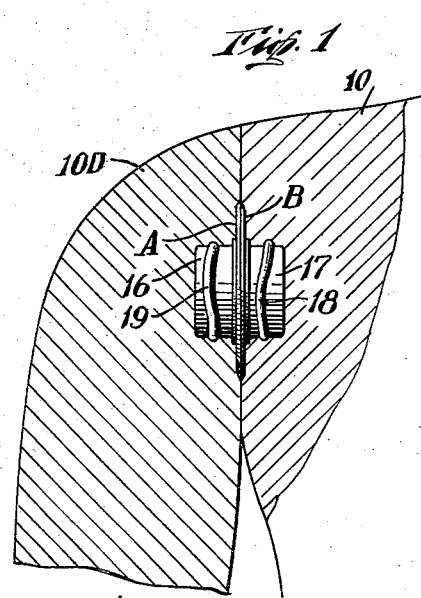
Fig. 1 illustrates fragmentarily the application of a connection between the arm and body of a dummy figure constructed according to our invention.

Referring now in detail to the drawings, a display manikin body 10 is provided with a female component 10C of the limb connection, while an arm 10D adapted for detachable connection to the body 10 is provided with the male component 10E of the limb connection. The female component 10C comprises the plate B formed with the eccentric circular hole 11 communicating with the centrally located rectangular hole 11A to form the hole 11B, in which the portion 11 is of greater diameter than the width of the rectangular portion 11A.

The male component 10E comprises the plate A through which passes the centrally located bolt 12 on which is rotatably mounted the concentric stud 13 of generally cylindrical shape. The stud 13 comprises the cylindrical head portion 13A and is relieved as at 14 so as to comprise the neck portion 14A, the latter comprising two parallel sides which fit snugly and non-rotatably into the rectangular portion 11A of the hole 11B in plate B, the head 13A being proportioned to pass through the circular hole 11 in plate B.

A nut 15 and washer 15A are preferably firmly fastened to the rear surface of plate A.

A cylindrical housing 16, closed at its outer end 16A, is firmly fastened to the rear surface of plate A concentrically therewith and surrounding nut 15 and bolt 12. A cylindrical housing 17, closed at its outer end 17A, is firmly fastened to the rear surface of plate B in concentric relation.

Figure 5:
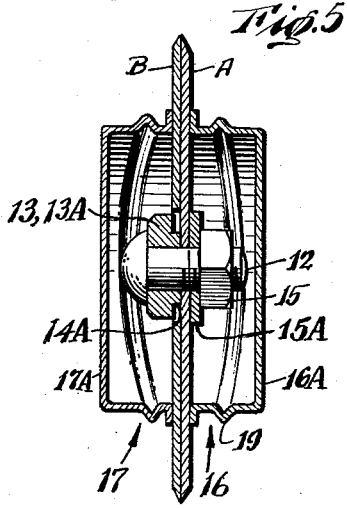
Figure 5 is a view similar to Figure 4 but with both components revolved 90 degrees on the axis of bolt 12.
Figure 4:
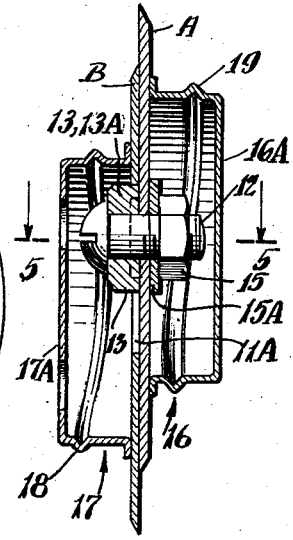
Figure 4 is similar, but with the components in position ready to be disconnected.

A ridge 18 extends outwardly from the cylindrical surface of housing 17, extending sinuously therearound and describing preferably two or more convolutions toward and away from plate B, as clearly shown by a comparison of Figures 4 and 5. A similar ridge 19 is formed in the cylindrical wall of housing 16. It is thus evident that when the housings 16, 17 are embedded in wet plastic material and placed in their respective parts of the display figure, upon the plastic material hardening the components are fixed against any motion relative to the parts of the figure in which they are embedded.

The bolt 12 being threaded, is threadedly engageable with nut 15 and can be tightened therein or loosened at will, thereby rendering stud 13 fixed relative to plate A or rotatable relative thereto. The engagement between stud 13 and plate A being frictional, it is also possible to tighten bolt 12 just enough to permit rotation between stud 13 and plate A upon the application of a considerable predetermined force as will be explained hereafter.

Figures 2, 3:
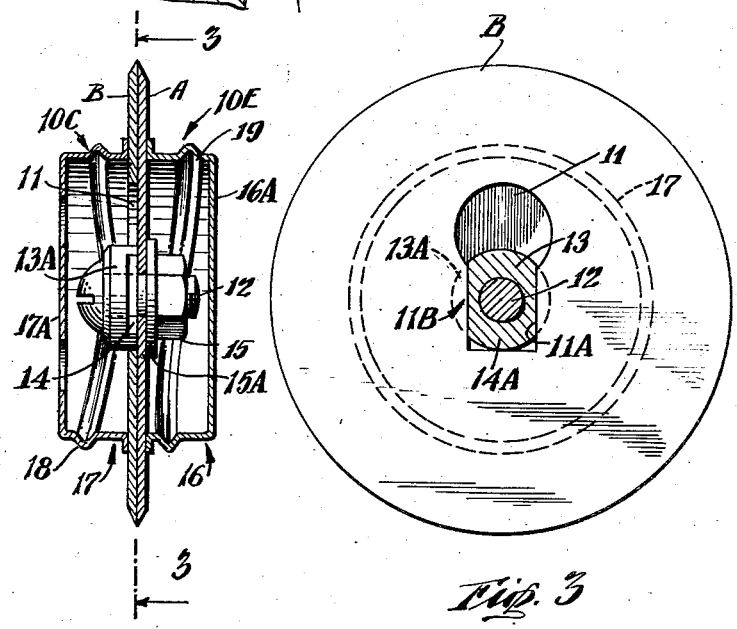
Fig. 2 is a diametral sectional view of the joint.
Fig. 3 is a inner face view of one of the adjustable plate members, partly in section.

With the bolt 12 screwed very tight into nut 15, the stud 13 is for all practical purposes firmly fixed against rotation relative to plate A. It thus has a definite angular relation to the manikin body 10 or other limb in which plate A is fixed. By introducing head 13A of stud 13 into the hole 11B, as best shown in Figure 4, that is, with the head 13A concentric with the hole 11, head 13A passes through hole 11 and the arm 10D carrying the plate A and the stud 13 will drop by force of gravity to the position shown in Figures 2 and 3. The arm or other limb 10D is now in a fixed angular relation to the display Figure 10 and cannot be moved out of said angular relation without either detachment of the arm from the figure or adjustment of the male component 10E.

If a different fixed angular relation of limb to figure is desired, the limb is first removed in obvious manner and bolt 12 unscrewed and the stud 13 rotated relative to plate A the desired amount, and the bolt 12 again tightened down very tight. When the arm 10D is again attached it will have a different fixed angular relation to the display Figure 10. It is also possible to tighten bolt 12 to such a degree that the arm 10D or other limb will maintain any position to which it is set, and yet may be moved angularly relative to body 10. Such movement of the arm 10D carries with it plate A, while stud 13 is nonrotatably held in plate B. The arm 10D will then maintain the new position to which it has been set.

In case it is not desired to provide adjustability of angular position of the limb relative to the body the bolt 12 may be screwed into the nut 15 to the maximum extent providing maximum frictional engagement between stud 13 and plate A, and the bolt 12 may then be fixed relative to nut 15 by any well known method.

It will thus be seen, that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, what we claim is:

1. In a limb connection for display figures, the combination with a plate, said plate comprising means adapted to interengage with means of a cooperating plate to detachably connect said plates together, of a substantially cylindrical housing connected to said plate, said housing comprising a ridge portion extending sinuously therearound.

2. In a limb connection according to claim 1, said ridge portion describing a plurality of convolutions toward and away from said plate.

3. In a limb connection for display figures, the combination with a plate formed with a hole therein, said hole comprising a lower substantially rectangular portion and an upper portion of greater width than said rectangular portion, of a plate comprising means for detachably engaging said hole in said first mentioned plate so as to lock said plates together, said means comprising a stud, said stud comprising a portion comprising parallel sides so as to be nonrotatably engageable with the rectangular portion of said hole, said stud further comprising a head portion passable through the wider portion of said hole, and means connecting said stud to said second plate, said plates further comprising means for attachment to parts of display figures.

4. In a limb connection according to claim 3, said means connecting said stud to said second plate comprising a bolt passing through both and a nut engaging said bolt.

5. In a limb connection according to claim 4, said stud being freely rotatable relative to said second plate and fixable against rotation relative thereto by tightening of said nut and bolt.

6. In a limb connection according to claim 5, said nut being firmly fixed to said plate on the side thereof opposite to said stud.

7. In a limb connection for display figures, the combination of a plate and a substantially cylindrical housing connected thereto, said housing comprising a ridge portion extending sinuously therearound.

FRED SCHUMACHER.
FRANK RUPPE.

REFERENCES CITED

The following references are of record in the file of this patent:

UNITED STATES PATENTS

| Number | Name | Date |
|---|---|---|
| 1,632,257 | Williams | June 14, 1927 |

FOREIGN PATENTS

| Number | Country | Date |
|---|---|---|
| 285,690 | Great Britain | Feb. 23, 1928 |
| 351,623 | Great Britain | June 2, 1931 |